United States Patent
Williams et al.

(10) Patent No.: US 6,397,343 B1
(45) Date of Patent: May 28, 2002

(54) METHOD AND SYSTEM FOR DYNAMIC CLOCK FREQUENCY ADJUSTMENT FOR A GRAPHICS SUBSYSTEM IN A COMPUTER

(75) Inventors: Ian M. Williams, Sunnyvale; Philip Cheng, San Jose, both of CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/273,247

(22) Filed: Mar. 19, 1999

(51) Int. Cl.[7] ................................................ G06F 1/08
(52) U.S. Cl. ...................................................... 713/501
(58) Field of Search ......................................... 713/501

(56) References Cited

U.S. PATENT DOCUMENTS

| | | | |
|---|---|---|---|
| 5,490,059 A | * | 2/1996 | Mahalingaiah et al. |
| 5,502,838 A | * | 3/1996 | Kikinis |
| 5,752,011 A | * | 5/1998 | Thomas et al. |
| 5,774,704 A | * | 6/1998 | Williams |
| 5,781,768 A | * | 7/1998 | Jones, Jr. |
| 6,141,762 A | * | 10/2000 | Micol et al. |

* cited by examiner

*Primary Examiner*—Thomas M. Heckler
(74) *Attorney, Agent, or Firm*—Woodcock Washburn LLP (57) ABSTRACT

In a computer system having a CPU and a graphics subsystem, a device for dynamic graphics subsystem clock adjustment. A clock pulse generator is used for generating a clock frequency. The clock frequency is coupled to the graphics subsystem and is used by the graphics subsystem to synchronize and pace its internal operations. The clock frequency generated by the generator is variable over a range. A controller is coupled to the clock pulse generator, for adjusting the clock frequency from the clock pulse generator over the range. The controller interfaces with the computer system through an interface coupled to the controller. Through the interface, the controller communicates with the computer system or graphics subsystem and determines a load placed on the graphics subsystem. The controller adjusts the clock frequency generated by the clock pulse generator such that the clock frequency increases when the load on the graphics subsystem increases and the clock frequency decreases when the load on the graphics subsystem decreases, dynamically adjusting the clock frequency in response to the load on the graphics subsystem.

20 Claims, 8 Drawing Sheets

METHOD AND SYSTEM FOR DYNAMIC CLOCK FREQUENCY ADJUSTMENT FOR A GRAPHICS SUBSYSTEM IN A COMPUTER

FIELD OF THE INVENTION

The field of the present invention pertains to the processing of graphics commands within the graphics subsystem of a computer. More particularly, the present invention relates to an apparatus for dynamically adjusting the clock rate of the graphics subsystem in a digital computer to control the overall system heat and noise output.

BACKGROUND OF THE INVENTION

Digital computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals.

The use of graphics computer systems for the graphical depiction of information, and other types of "visual computing" which present data to the user visually, represent one of the more compelling applications of computer graphics. Graphics have also become a key technology for communicating ideas, data, and trends in most areas of commerce, science, and education. For example, real time user interaction with three dimensional (3D) models and pseudo-realistic images is now feasible on high-performance workstations. These workstations contain dedicated, special purpose graphics hardware. The progress of semiconductor fabrication technology has made it possible to do real time 3D animation, with color shaded images of complex objects, described by thousands, and often millions, of polygons, on powerful dedicated rendering subsystems. The most recent and most powerful workstations are capable of rendering completely life-like, realistically lighted, 3D objects and structures.

In a typical 3D computer generated object, the 3D object is typically described by bounding surfaces, possibly combined with topology and other attributes of the objects describing the data model. Surfaces are typically represented by graphics "primitives" such as triangles, polygons or polyhedra. These primitives define the shape of the object and simplify the process of rendering. Other object attributes, such as connectivity or topology can also ease the rendering process by describing how objects fit together. Primitives are typically shaded, Z-buffered, and textured onto an array of pixels, during the rendering process which yields a realistic 3D image.

In a typical graphics computer, most of the actual rendering computation is performed by a graphics subsystem included within the computer. The 3D object data models are "traversed" by a software program (e.g., in response to user input to change viewing position) running on one or more processors in a processor subsystem within the graphics computer. The primitives describing the 3D object are processed by the processor subsystem and sent to the graphics subsystem for rendering. For example, a 3D polygonal model of an object is sent to the graphics subsystem as contiguous strips of polygons, sent to the graphics subsystem as a graphics data stream (e.g., a list of primitives, rendering commands, instructions, etc.). Using this information, the graphics subsystem performs all the computational processing required to realistically render the 3D object. The hardware of the graphics subsystem is specially tuned to perform such processing quickly and efficiently in comparison to the CPU (central processing unit) subsystem, however, it may utilize the CPU or CPU's as part of the rendering process.

To facilitate fast and efficient graphics processing, typical graphics subsystems are deeply pipelined, including many different stages for processing graphics data and commands. The large number of stages are sequenced and linked such that at any given instant, several data items or commands are being processed. Each stage is optimized to perform specific task. When it completes its task, another graphics command or data item is ready for processing. A modern, deeply pipelined, graphics processing subsystem can run at clock speeds of 266 MHz or more, processing enormous amounts of data.

However, even these clock speeds are often not sufficient for the most demanding 3D applications currently being envisioned. Such applications require the traversal of very large data models and the generation, display, and interaction with highly complex 3D objects, often in real-time. A partial list of such applications include the generation of special effects for movies, real-time engineering design and simulations, weather prediction, high fidelity virtual reality, computational fluid dynamics, medical diagnostic imaging, etc. As graphics computer systems become more powerful, the applications in which they are used proliferate, prompting the need for yet more graphical computing power.

One of the methods used by designers to increase graphics software execution speed is to increase the graphics subsystem "clock speed." Clock speed refers to the rate at which the graphics subsystem steps its way through the individual software instructions. With many graphics subsystem designs, one or more instructions are executed per clock cycle. Increasing the number of clock cycles per second directly increases the number of instructions executed per second. Modern graphics subsystem's often are "clocked" in excess of 200 MHz and execute many millions of instructions (e.g., interpolations, transformations, etc.). Graphics applications which run on computer devices using such graphics subsystems perform much better. Thus, computer designers set the graphics subsystem clock frequency as fast as possible.

Graphics subsystem clock frequency, however, as with the CPU subsystem clock frequency, cannot be increased without limit. If a graphics subsystem is clocked at too high a rate, excessive power consumption occurs, leading to overheating of the components of the graphics subsystem. Over heating leads to computational errors, unpredictable graphics subsystem behavior, or even physical destruction of one or more of the components of the graphics subsystem. Thus, the primary limiting factor to higher clock speeds is the fact that the higher speeds also lead to higher power consumption, and the high power consumption leads to high heat levels. The problem is exacerbated as more and more graphics functions are being integrated into smaller and smaller semiconductor dies, often having many millions of transistors. The need to the efficiently dissipate increasingly large amounts of heat becomes even more acute.

Thus, increasing the graphics power of the computer systems by increasing the clock speed leads to increasing power dissipation problems. Typical prior art solutions involve the use of elaborate heat dissipation mechanisms. Such mechanisms include, for example, the mounting of large, dedicated heat sinks directly onto the graphics processing chips, the use of large enclosures to increase air circulation around the graphics components, the use of large combination heat sink/fans, or even in some cases, the use of elaborate and sophisticated liquid cooling systems.

The above methods each have associated disadvantages. For example, in the case of the incorporation of a combination heat sink/fan, the fan adds additional noise to the operation of the system. This noise may prove unacceptable to system users. The additional heat sink (being additional to the respective heat sinks coupled to the one or more microprocessors) also adds size constraints to the design of the system enclosure. In the case of sophisticated active cooling schemes (e.g., liquid cooling), the added complexity adversely impacts the reliability of the computer system and significantly adds to the system's cost, as well as cost of placement and maintenance, etc.

Other types of prior art methods for handling power consumption and heat dissipation involve the "selective" shut down of system components or subsystems. One such method involves placing an entire computer system into a "sleep" mode. During extended periods of inactivity, the components of the a computer system are placed into a low power state. The system remains primed for a "wake-up" when, for example, the user initiates some new action, wherein the previously powered down components resume operation.

The prior art "sleep mode" solutions are less than ideal in that they require periods of non-use in order to operate. For example, they require non utilization on the part of the user prior to placing the components of the computer system into a low power state. They also prevent typical system activity in such states. Hence, the prior art sleep mode solutions are not functional when the computer system is actually being used.

Thus, what is required is a solution which is able to adjust the heat output of the graphics subsystem of a computer system without preventing normal operation and requiring periods of non-use. What is required is a solution that does not involve the use of complex external components for augmenting heat dissipation, which unnecessarily add cost and complexity to a computer system. The required solution should operate efficiently, allowing the graphics subsystem to function at maximum performance without increasing the risk of heat induced errors, or damage, as well as be able to reduce heat output while maintaining normal operation. Many graphics software applications typically demand very fast graphics subsystems in order to deliver their best overall performance for the user. What is further required is a method and system for controlling other adverse system output levels, such as unwanted RF emissions, noise, and the like. Thus, what is needed is a method and apparatus which runs software programs or portions of programs, at peak performance for the user, yet does not lead to generation of excessive heat when not desired or required. The present invention provides a novel solution to the above requirements.

SUMMARY OF THE INVENTION

The present invention provides a method and system capable of adjusting the heat output of the graphics subsystem of a computer without reducing system capabilities or requiring periods of non-use. The present invention provides a solution that does not involve the use of complex external components for augmenting heat dissipation, and does not unnecessarily add cost and complexity to a computer system. The system of the present invention operates efficiently, allowing the graphics subsystem to function over a range of performance to control heat generation, RF emissions, and/or noise generation from the system. Many graphics software applications typically demand very fast graphics subsystems in order to deliver their best overall performance for the user. To accommodate them, the method and system of the present invention runs graphics software programs, or some portions thereof, at peak performance for the user when heat and other associated system output levels (RF emissions, noise, etc.), yet also allows these levels to be controlled without removing the systems ability to perform graphics operations.

In one embodiment, the system of the present invention is implemented as a device for dynamic graphics subsystem clock adjustment within a computer system having a CPU and a dedicated graphics subsystem. The device is comprised of a clock pulse generator for generating a clock frequency. The clock frequency is coupled to the graphics subsystem and is used by the graphics subsystem to synchronize and pace its internal operations. The clock frequency generated by the generator is variable over a range. A controller is coupled to the clock pulse generator, for adjusting the clock frequency from the clock pulse generator over the range. A system interface is coupled to the controller to interface various inputs from the graphics subsystem and the computer system with the controller. Based upon the heat of the graphics subsystem or other associated output levels (RF emissions, noise, etc.), the controller adjusts the clock frequency over the range to control the heat and/or other associated output levels of the graphics subsystem.

The system interface is coupled to the graphics subsystem to allow the controller to determine a graphics processing load placed on the graphics subsystem. Other inputs are also coupled to the controller via the system interface. For example, a temperature sensor is coupled to the system interface to communicate the temperature of the graphics system. An RF sensor and a noise sensor are coupled to the system interface to allow the controller to determine the RF emmissions of the graphics sub system and/or the computer subsystem and the noise output of the computer system (e.g., from cooling fans or other cooling apparatus). The controller adjusts the clock frequency generated by the clock pulse generator such that the clock frequency decreases when the temperature or other associated output levels of the graphics subsystem increases to a certain level and the clock frequency increases when the temperature or other associated output levels of the graphics subsystem decreases to a certain level, dynamically adjusting the clock frequency in response to the heat generation, RF emissions, and/or noise output of the graphics subsystem.

The dynamic adjustment of the clock frequency in response to heat generation overcomes the over heating and excessive noise generation problems of high clock frequency graphics subsystems. Large, complex graphics intensive software applications, or specific graphics intensive sub-portions thereof, are run at maximum speed in order to deliver the best performance taking into consideration the users environment. However, the clock frequency is reduced when the impact on the users environment is unacceptable, without, however, precluding any of the graphics capability desired by the user. In so doing, the present invention adjusts the thermal output of the graphics subsystem without requiring periods of non-use, the use of complex external components for augmenting heat dissipation, or the like, allowing the graphics subsystem to function at maximum performance when needed, without increasing the risk of heat induced errors, or damage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A device and method for dynamic graphics subsystem clock adjustment in response to system temperature and environmental output levels is disclosed. Reference will now be made in detail to the preferred embodiments of the invention, examples of which are illustrated in the accompanying drawings. While the invention will be described in conjunction with the preferred embodiments, it will be understood that they are not intended to limit the invention to the these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not unnecessarily to obscure aspects of the present invention.

The present invention provides a dynamic graphics subsystem clock frequency adjustment method and system that adjusts the heat output of the graphics subsystem and potentially overall system noise output level of a computer without requiring periods of non-use, or removing any graphics capability from the system. The present invention provides a solution that does not involve the use of complex external components for augmenting heat dissipation, and does not unnecessarily add cost and complexity to a computer system. The system of the present invention operates efficiently, allowing the graphics subsystem to function at maximum performance without increasing the risk of heat induced errors, or damage. Many graphics software applications typically demand very fast graphics subsystems in order to deliver their best overall performance for the user. To accommodate them, the method and system of the present invention runs graphics software programs, or some portions thereof, at peak performance for the user, yet does not lead to over heating of the graphics subsystem or result in an unacceptable impact on the system user's environment through excessive noise levels or other such impacts. The present invention and its benefits are further described below.

Figure 1:
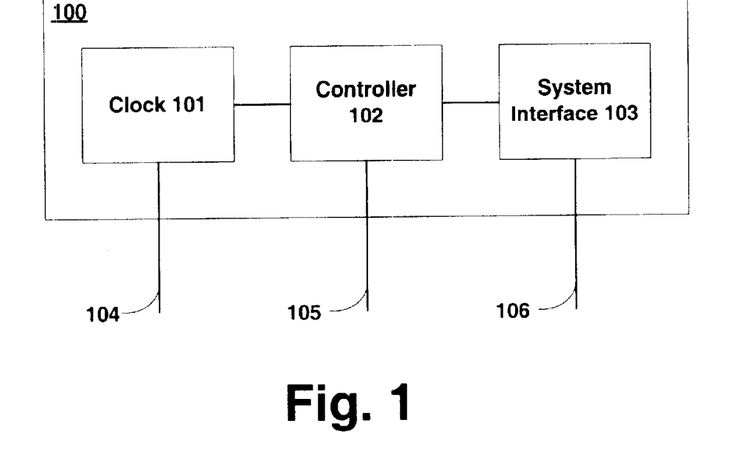
FIG. 1 shows a diagram of a graphics subsystem clock adjustment device in accordance with one embodiment of the present invention.
Figure 2A:
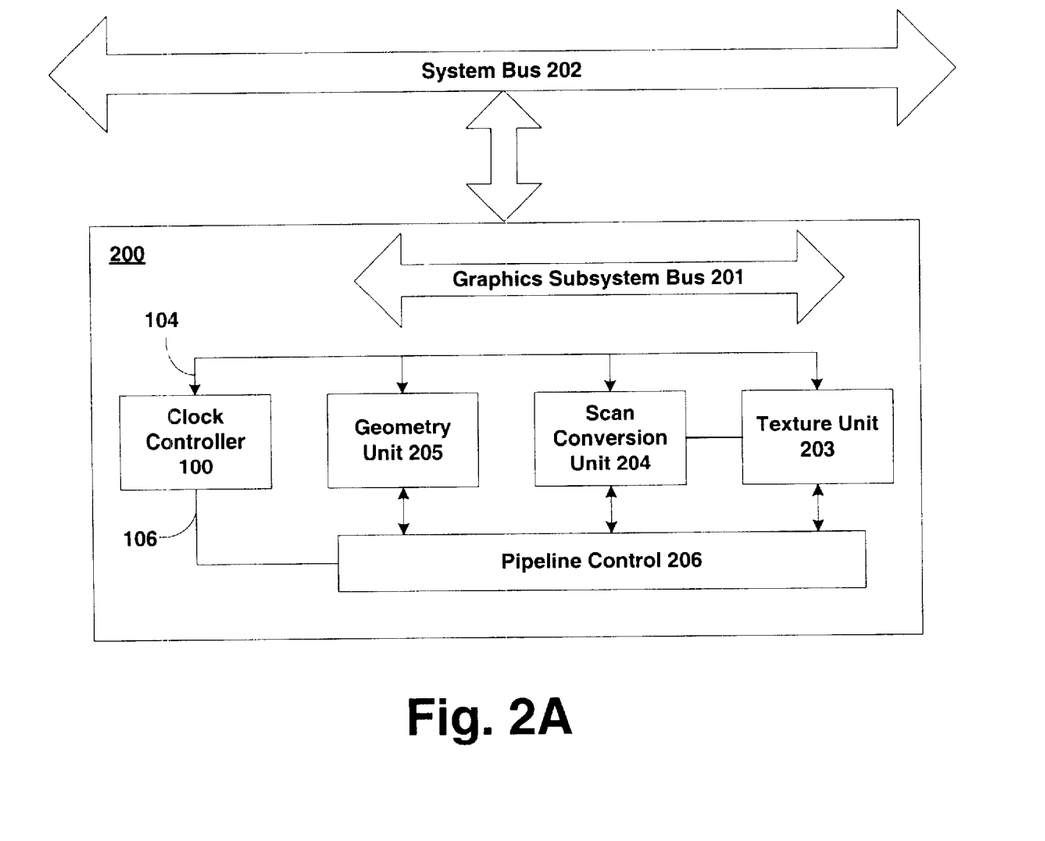
FIG. 2A shows a diagram of a graphics subsystem having an integrated graphics subsystem clock adjustment device in accordance with one embodiment of the present invention.

With reference now to FIG. 1, a block diagram of the graphics subsystem clock adjustment device is shown. The device 100 of the present invention is comprised of a clock pulse generator 101 for generating a clock frequency. The clock frequency generated by the generator is variable over a broad frequency range. The clock frequency is coupled to a clock frequency output line 104. Clock frequency output line 104 is coupled to a graphics subsystem (e.g., graphics subsystem 200 of FIG. 2) and is used by the graphics subsystem to synchronize and pace its internal operations. A controller 102 is coupled to the clock pulse generator, for adjusting the clock frequency from the clock pulse generator over the frequency range. The controller is adapted to accept a number of different algorithms for determining the clock frequency. The goal of the controller is to run the graphics subsystem as fast as possible when permitted by its graphics load, heat generation, as well as other factors (e.g., noise, RF emissions, and the like) as well as taking into account the need and requirement to deliver as high a performance as possible.

An interface 103 is coupled to the controller 102. The interface 103 is coupled to an interface line 106. The interface 103 transmits one or more input signals to the controller 102. The input signal transmitted to controller 102 depends upon the nature of the input device 100 relies upon to adjust the graphics subsystem clock frequency. For example, in a case where interface 103 is coupled to the graphics subsystem to receive an indication of the load on the graphics subsystem (e.g., the embodiment shown below in FIG. 2A), this load indication is coupled to controller 102, which in turn, controls the graphics subsystem clock frequency accordingly. In this case, the device 100 dynamically adjusts the clock frequency in response to the load on the graphics subsystem. The controller adjusts the clock frequency generated by the clock pulse generator such that the clock frequency increases when the load on the graphics subsystem increases and the clock frequency decreases when the load on the graphics subsystem decreases.

With reference now to FIG. 2A, a block diagram of the graphics subsystem clock adjustment device integrated within a graphics subsystem device (e.g., a single integrated circuit die). In this embodiment, the graphics subsystem and the clock controller device 100 are integrated entirely within a single semiconductor integrated circuit. Additionally, in this embodiment, the clock controller device 100 adjusts the graphics subsystem clock frequency based upon a detected load on the graphics subsystem. The exemplary graphics subsystem 200 includes a geometry unit 205, a scan conversion unit 204, and a texture unit 203. Graphics instructions and associated data are received and dispatched across a graphics subsystem bus 201. The graphics instructions and data are processed by the geometry unit 205, scan conversion unit 204, and texture unit 203, with a pipeline control 206 coordinating their operation and timing. The graphics subsystem bus 201 is coupled to a system bus 202. The system bus is in turn coupled to the rest of the computer system (not shown) in order to communicate with the CPU subsystem, main memory, etc.

In the present embodiment, device 100 is integrated into the same die with the graphics subsystem 200. The system interface line 106 is coupled to the pipeline control 206 of the graphics subsystem 200. The clock frequency line 104 is coupled to the geometry unit 205, the scan conversion unit 204, and the texture unit 203, and communicates a clock frequency. The clock frequency serves as the master clock signal upon which the operation and synchronization of the components of the graphics subsystem 200 are derived. The device of the present invention 100 determines a load on the graphics subsystem via the activity detected in pipeline control 206 through the system interface line 106. In response to the determined load, the device 100 sets the clock frequency. When the load detected increases, the device 100 increases the clock frequency. When the load decreases, the device 100 decreases the clock frequency.

In this embodiment, the present invention uses heuristic algorithms to determine the heat level of the graphics subsystem 200 by tracking the processing load on graphics subsystem 200 over a period of time. The algorithms are based upon the assumption that high processing loads over extended periods of time leads to excessive heat buildup. By tracking the amount of time graphics subsystem 200 functions under high load, the clock controller device 100 can determine the approximate heat level of graphics subsystem 200. When heat levels reached dangers levels, the clock controller device 100 incrementally reduces the clock frequency to reduce heat buildup.

For example, certain types of graphics applications require intensive rendering processing by graphics subsystem 200 (e.g., updating a computer aided design model). During these periods, the the processing load upon geometry unit 205, scan conversion unit 204, and texture unit 203 is increased. During these periods of peak loading, the heat output of these components is correspondingly increased, raising the thermal output of the components 203–205 and increasing their operating temperature. The increased loads and the amount of time components 203–205 operate at the increased loads is tracked by the clock controller device 100. This information allows the clock controller device 100 to determine when safe heat levels have been exceeded. Once maximum safe heat levels have been exceeded, the clock controller device 100 incrementally decreases the clock frequency, thereby reducing the power consumption and heat generation of the graphics subsystem. During this period, the heat output of the graphics subsystem 200 is lower, leading to reduced operating temperature. Similarly, the amount of time graphics subsystem 200 functions at reduced clock frequencies allows the clock controller device 100 to determine a point in time wherein the clock frequency can be safely increased.

Thus, by selectively increasing and decreasing the clock rate 104 of the graphics subsystem 200 in response to load, the present invention allows the peak processing rate to be significantly higher. The peak processing rate corresponds to the peak heat generating rate. By carefully keeping track of the amount of time graphics subsystem 200 runs under peak loads, the clock controller device 100 is able to run graphics subsystem 200 at peak clock rates during periods of maximum demand, and subsequently reduce the clock rate once thermal limits are exceeded.

In so doing, the maximum attainable performance of the graphics subsystem 200 is greater than that attainable if a constant clock rate were used. Slowing the clock rate 204 during periods of non-use allows the dissipation of greater amounts of heat, and a corresponding reduction of the operating temperature. Thus, when maximum performance is required, the lowered temperature allows the graphics subsystem 200 to generate large amounts of heat for a longer period of time without exceeding thermal limits. In so doing, the present invention actively manages the thermal output of the graphics subsystem 200 to optimize performance in accordance with the needs of the user.

In addition to detecting the graphics subsystem load by monitoring the processing activity of graphics subsystem 200 via pipeline control 206 (e.g., by snooping graphics commands and data flowing through a graphics pipeline), it should be noted that device 100 can be configured to use additional inputs to determine graphics subsystem load. For example, device 100 can be coupled to detect graphics subsystem load by monitoring activity on the system bus 202. The device 100 can be coupled individually to each of components 203–205 to detect their respective processing activity (e.g., large scale surface evaluation within geometry unit 205).

Further, device 100 can interface directly with a software program executing on, for example, a CPU subsystem of the computer via specific software instructions generated by the program, wherein the instructions are operable to directly set the clock frequency of the graphics subsystem such that the heat output is brought under the direct control of the software program. Alternatively, as opposed to adding new specifically tailored software instructions, controller 100 can be configured to monitor the loading and/or unloading of certain graphics libraries as an indicator of graphics subsystem loading. For example, to perform certain types of graphics intensive functions, the corresponding graphics libraries for implementing the functions need to be called and instantiated first. This activity can be monitored to provide an indication of impending high loads, and the clock frequency adjusted accordingly.

In should also be noted that, in addition to adjusting the clock rate of each of components 203–205, capable of selectively shutting down specific individual ones of sub-components 203–205 of the graphics subsystem 200 in response to the nature of the graphics processing load placed upon graphics subsystem 200. For example, certain types of graphics processing applications do not require texture mapping support (e.g., surface subdivision, surface evaluation, etc.). With these applications, clock controller can selectively shut down texture unit 203 further limit thermal output. Similarly, for those applications which do not require support of certain components of graphics subsystem 200, the clock signal for those specific components can be shut down, gated, or otherwise limited such that the specific components are shut down or otherwise placed into a low power state.

Referring still to FIG. 2A, it should be appreciated that the components and layout of the graphics subsystem 200 may vary with particular embodiments. The exemplary graphics subsystem 200 in accordance with the present invention depicts an internal geometry unit 205, scan conversion unit 204, texture unit 203, and the like, as shown in FIG. 2. In this embodiment, the clock frequency line 104 of graphics subsystem clock adjustment device 200 is coupled to other units in addition to the scan conversion unit 204, in order to properly synchronize the operation of the graphics subsystem 200. Given this, the graphics subsystem clock adjustment device 100 of the present invention may be implemented in a number of graphics subsystem and system configurations, including much more massively parallel, multi-chip graphics subsystems including large number of parallel configured components 203–205, graphics subsystems where the functionality represented by components 203–205 is implemented in a large array of subcomponents, or more simple graphics subsystems including integrated circuits which do not have a distinct geometry unit, texture unit, and scan conversion unit subcomponents.

Figure 2B:
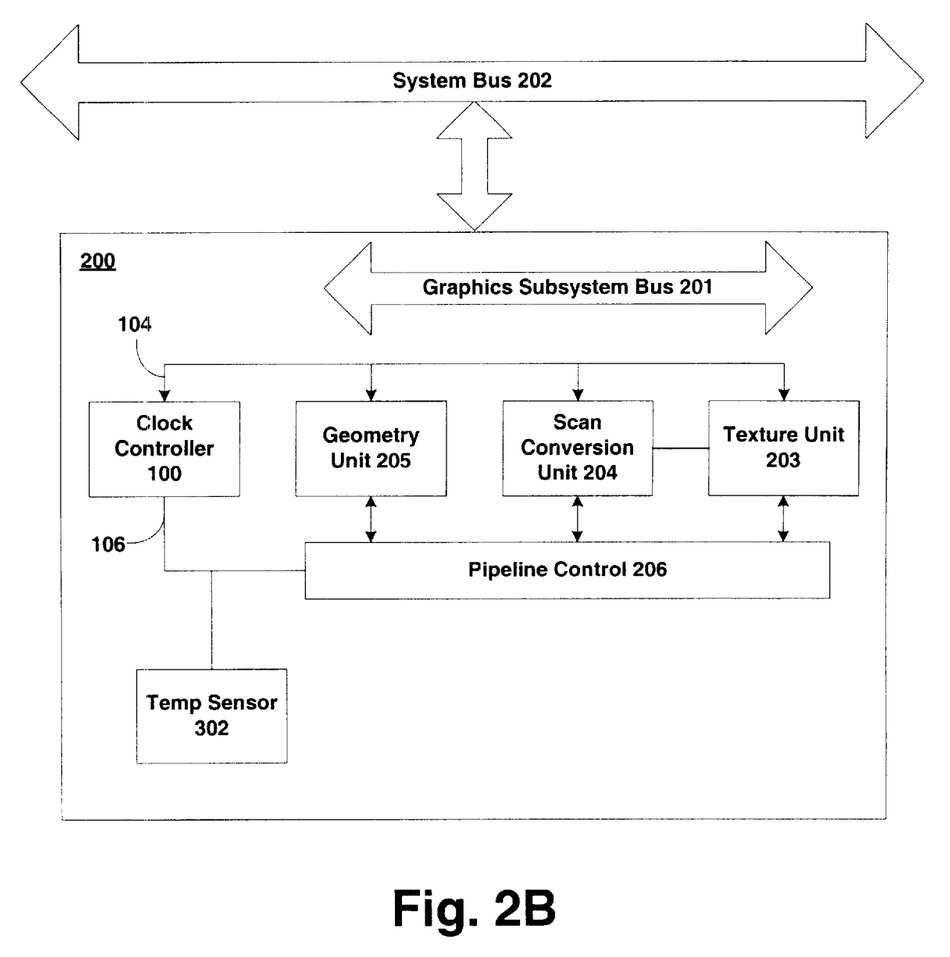
FIG. 2B shows a diagram of a graphics subsystem with an integrate graphics subsystem clock adjustment device with a temperature sensor in accordance with one embodiment of the present invention.

Referring now to FIG. 2B, graphics subsystem 200 incorporating a temperature sensor 302 in accordance with one embodiment of the present invention is shown. Graphics subsystem 200 functions as described above in the discussion of FIG. 2A. However, as depicted in FIG. 2B, a temperature sensor 302 is included in graphics subsystem 200. Temperature sensor 302 is coupled to the clock controller device 100 via line 106 along with pipeline control 206. Temperature sensor 302 is integrated directly within the semiconductor die of graphics subsystem 200. Hence, in this embodiment, the clock controller device 100 receives to inputs: a measured temperature of the graphics subsystem 200 as determined by temperature sensor 302, and the graphics processing load of graphics subsystem 200 as determined via pipeline control 206. Thus, controller 102 can process both load information and temperature information to determine whether graphics subsystem 200 has exceeded its thermal limits.

Figure 3:
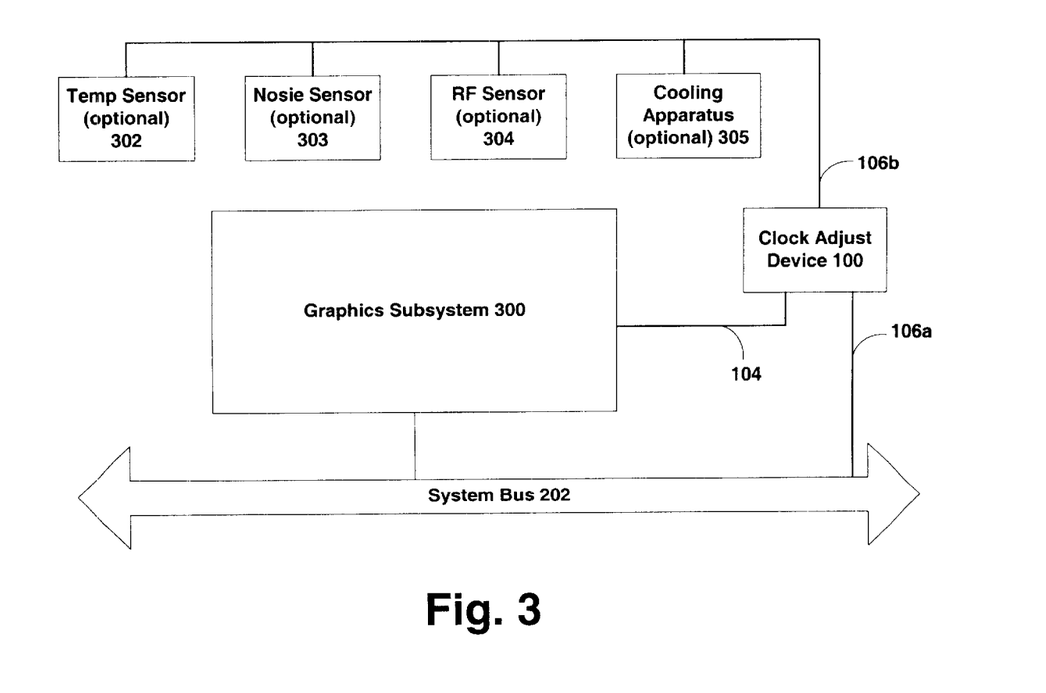
FIG. 3 shows a diagram of a graphics subsystem having an external graphics subsystem clock adjustment device and multiple optional sensors in accordance with one embodiment of the present invention.

With reference now to FIG. 3, a block diagram of an externally configured graphics subsystem clock adjustment device in accordance with the present invention is shown. In this embodiment, graphics subsystem 300 is implemented as a multi-element printed circuit board which couples to the computer system, in this case, via system bus 202. In this embodiment, the clock adjustment device 100 is located on the same printed circuit board as graphics subsystem 300. The device 100 is coupled to the graphics subsystem 300 through the clock frequency line 104. In this embodiment, the system interface line 106 includes two components, a system interface line 106a and a system interface line 106b. The device 100 is coupled to the system bus 202 through the system interface line 106a. The device 100 is coupled to a number of optional sensors 302–305 through the system interface line 106b. The graphics subsystem 300 is coupled to the rest of the computer system (not shown) through the system bus 202. As described above, the graphics subsystem 300 receives a clock frequency through the clock frequency line 104.

In this embodiment, a number of optional sensors 302–305 are shown. As described above, the device 100 detects a graphics subsystem load through the system interface line 106a and receives temperature information from temperature sensor 302. However, in addition to graphics subsystem load and graphics subsystem temperature, device 100 also receives noise information from noise sensor 303 and RF emission information from RF sensor 304. The noise information allows device 100 to adjust the clock frequency of graphics subsystem 300 in response to environmental noise (e.g., produced by cooling fans, circulation fans, and the like). The RF emission information allows device 100 to adjust the clock frequency in response to the generated RF output of graphics subsystem 300. For example, to remain within electromagnetic interference (EMI) guidelines, device 100 can adjust the clock frequency graphics subsystem 300 to reduce its corresponding RF output.

In this embodiment, the device 100 also controls an amount of cooling applied to the graphics subsystem 300 by the cooling apparatus 305 (e.g., a fan equipped heat sink) through control signals sent over the system interface line 106b. The device 100 increases the amount of cooling when the high heat levels are detected and decreases the amount of cooling when the lower heat levels are detected. In this manner the amount of cooling varies depending on the heat level of the graphics subsystem 300. In so doing, the total time the graphics subsystem 300 may be run at a maximum clock frequency is increased, the excess heat being carried away by the increased amount of cooling. The noise generated and power consumed by the cooling apparatus 305, however, may be reduced by reducing the amount of cooling delivered to the graphics subsystem 300 when the graphics subsystem 300 is running at reduced loads. Similarly, RF emissions generated by the cooling apparatus 305 may be reduced by reducing the amount of cooling delivered graphics subsystem 300.

The cooling apparatus 305 may be comprised of a number of cooling devices well known in the prior art (e.g. a heat sink incorporating a fan mounted directly onto the graphics subsystem, a fan coupled to the ventilation opening of the computer system's case, etc.). The cooling apparatus 305 delivers a varying amount of cooling to the graphics subsystem 300 in response to the control signals received over the control line 106b from the device 100. Hence, for example, the graphics subsystem 300 can be "over clocked" (run at higher than continuously sustainable speeds) for periods of time when maximum performance is desired and subsequently cooled by the device 100 of the present invention when the load is reduced and the need for maximum performance has past. Thus, a computer system including the present invention will appear faster than a standard computer system of the prior art.

Additionally, in the case where cooling apparatus 301 includes a cooling fan, the operation of clock adjustment device 100 reduces the noise level attributed to the cooling apparatus during periods of decreased load. This reduces the overall noise output of the computer system, allowing the computer system to more easily comply with noise output requirements or regulations.

The clock adjust device 100 can use the heat information from temperature sensor 302 to control the amount of cooling or the clock frequency. The heat information can act as a safety mechanism to inform the clock adjust device 100 of dangerous "over temperature" conditions. Hence, clock adjustment device can ensure graphics subsystem 300 is not run too long at its peak clock rate, in a case where, for example, the user is performing large scale rendering intensive processing.

Figure 4:
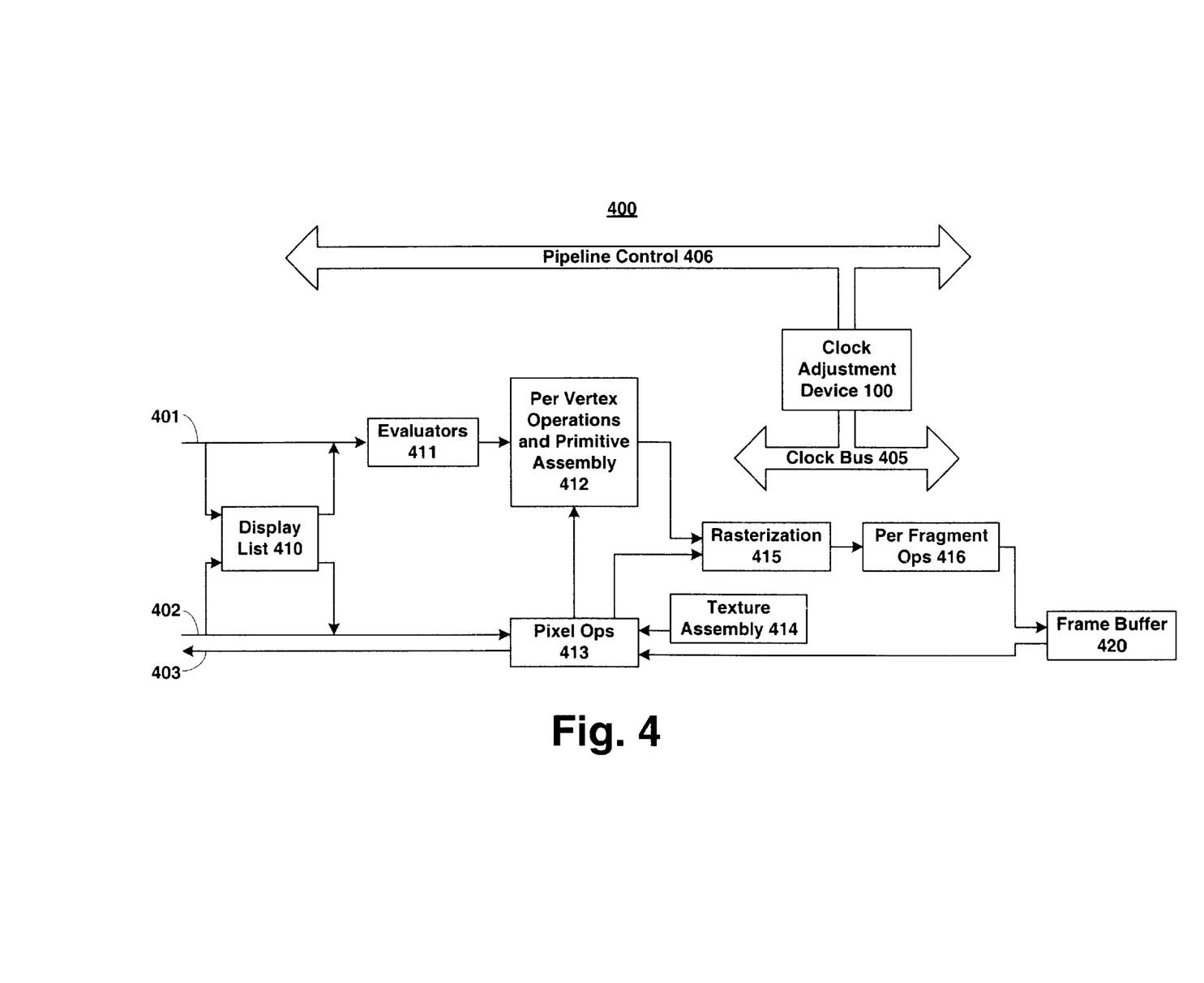
FIG. 4 shows a diagram an Open GL graphics pipeline in accordance with one embodiment of the present invention.

With reference now to FIG. 4, a diagram of a more complex embodiment of a graphics subsystem 400 in accordance with one embodiment of the present invention is shown. Graphics subsystem 400 shows the functional components of an exemplary Open GL graphics subsystem incorporating a clock adjustment device 100 of the present invention.

As depicted in FIG. 4, graphics subsystem 400 includes a first and second instruction buss 401 and 402 coupled to a display list memory 410, evaluators 411, and pixel operations unit 413. The evaluators 411 are coupled to a per-vertex and primitive assembly unit 412. The pixel operations unit is coupled to a frame buffer 420 and a texture assembly unit 414. The output of the pixel operations unit is coupled to a rasterization unit 415. The output of the per-vertex and primitive assembly unit is also coupled to the rasterization unit 415, which is in turn, coupled to a per-fragment operations unit 416. The output of the per-fragment operations unit is coupled to the frame buffer 420.

Graphics subsystem 400 implements high performance Open GL graphics processing, wherein typically, most of the actual rendering computation is performed by a graphics subsystem 400 as opposed to the CPU subsystem of the computer. The primitives describing the 3D object are either processed by the processor subsystem and sent to the graphics subsystem for rendering, and arrive via busses 401 and 402, or alternatively they can be requested by the graphics subsystem directly from sections of memory. For example, a 3D model of an object is sent to the graphics subsystem 400 as contiguous strips of triangles or polygons along with other graphics data (e.g., primitives, rendering commands, instructions, etc.). This data stream provides the components 410–416 of graphics subsystem 400 with all the information required to render the 3D object and the resulting scene. Such information includes, for example, specular highlighting, anti-aliasing, depth, transparency, and the like. Using this information, components 410–416 perform the computational processing required to realistically render the 3D object into frame buffer 420.

In this embodiment, clock adjustment device 100 is coupled to each of components 410–416 via a clock bus 405 and a pipeline control 406. Clock adjustment device 100 is able to individually adjust the clock frequency of any one or all of components 410–416 in response heat generation of each or several components. As described above, depending upon the particular implementation, the clock frequency coupled to components 410–416 can be adjusted individually or as a group. In addition, clock adjustment device can be coupled to external devices (e.g., noise sensors, cooling apparatus, etc. as shown in FIG. 3) to further quantify heat generation and the systems environmental impact.

Figure 5:
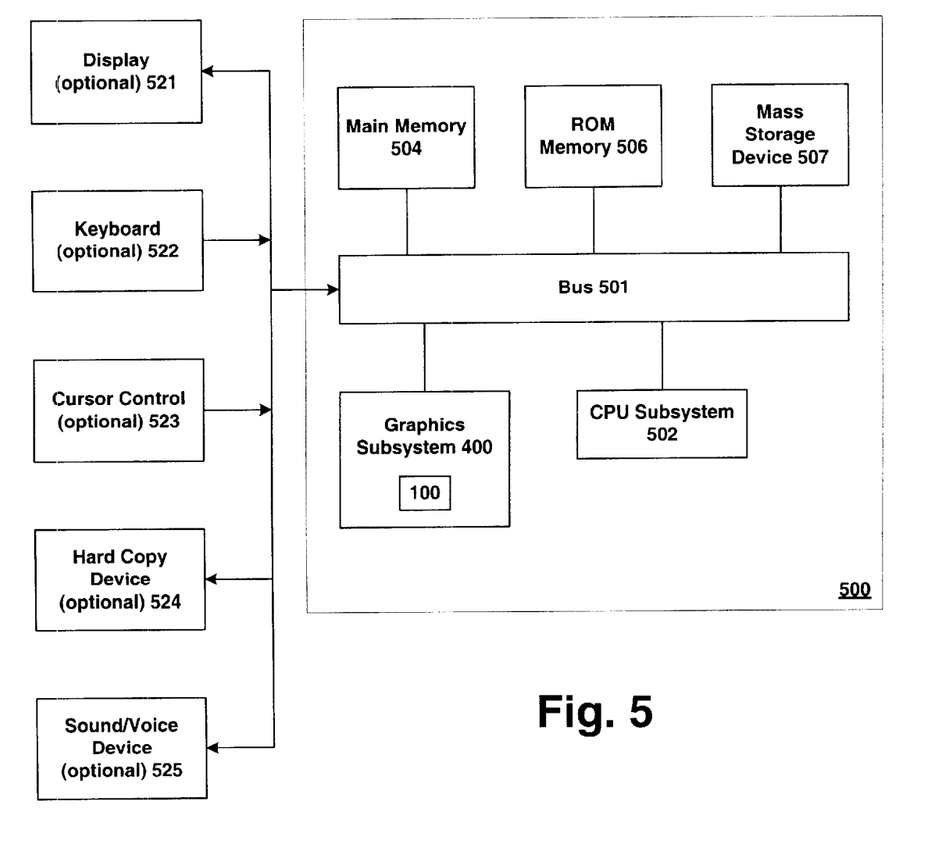
FIG. 5 shows a diagram of a graphics computer system platform in accordance with one embodiment of the present invention.

FIG. 5 shows a 3D graphics computer system 500 upon which the graphics subsystem clock adjustment process of present invention may be practiced. System 500 includes graphics subsystem 400 for generating complex or 3 dimensional images and displaying the resulting images on display subsystem 534. Computer system 500 includes a bus 501 for transmitting digital information between the various parts of the computer system. One or more microprocessors 502 are coupled to bus 501 for processing information. The information along with the instructions of how the information is to be processed are stored in a hierarchical memory system comprised of mass storage device 507, read only memory 506, main memory 504, and static random access memory (SRAM) 503. Mass storage device 507 is used to store vast amounts of digital data. The mass storage device 507 can consist one or more hard disk drives, floppy disk drives, optical disk drives, tape drives, CD ROM drives, or any number of other types of storage devices having media for storing data digitally. A read only memory (ROM) 506 is used to store digital data of a permanent basis, such as booting instructions for the microprocessors. Main memory 504 is used for storing digital data on an intermediate basis. Main memory 504 can be dynamic random access memory (DRAM).

Several optional devices may also be coupled to system 500. For example, an alphanumeric keyboard 522 is used for inputting commands and other information to processor 502. Another type of user input device is cursor control device 523 (a mouse, trackball, joystick, and the like) used for positioning a movable cursor and selecting objects on a computer screen. Another device which may be coupled to bus 501 is a hard copy device 524 (e.g., a laser printer) for printing data or other information onto a tangible medium. Additionally, a sound recording or video option 525 can be coupled to the system 500 to provide multimedia capabilities.

Figure 6A:
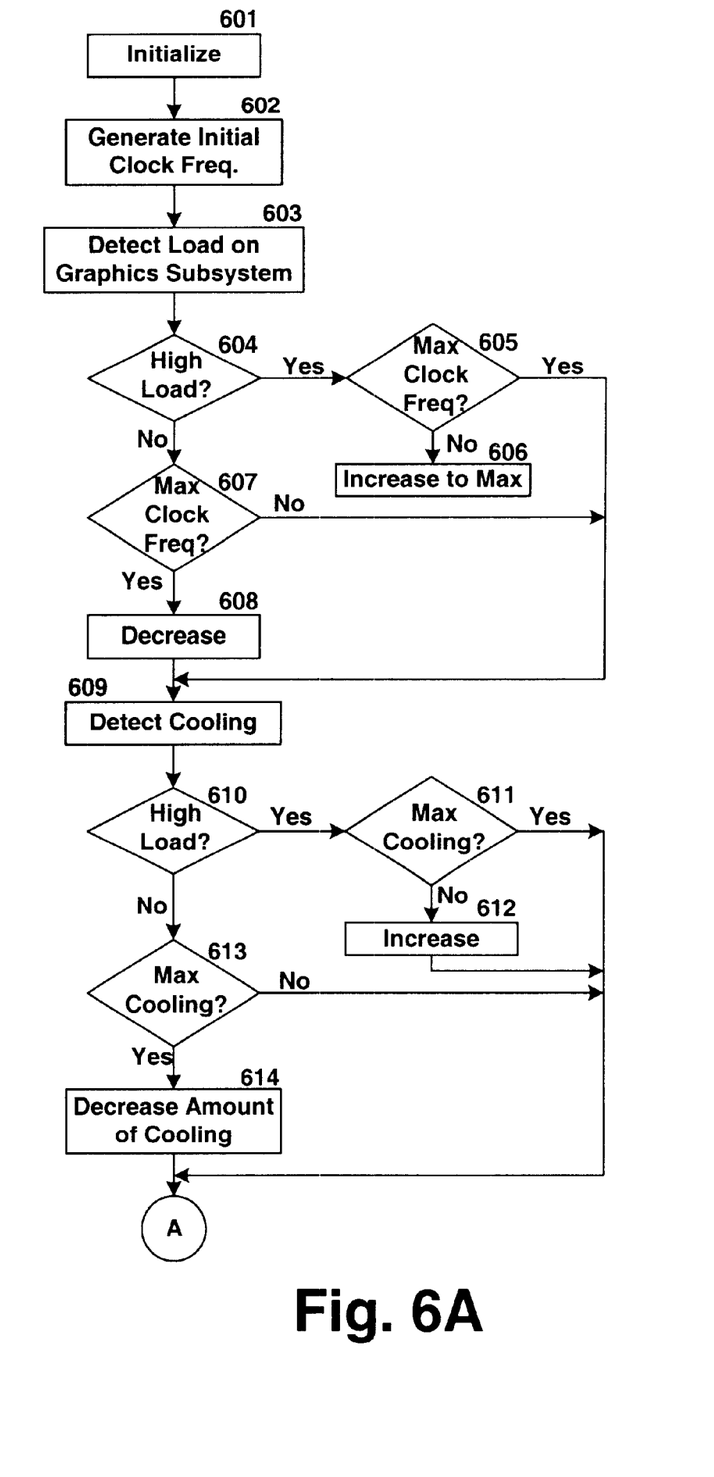
FIG. 6A shows a first portion of a flow chart of the process employed by the graphics subsystem clock adjustment device of the present invention.
Figure 6B:
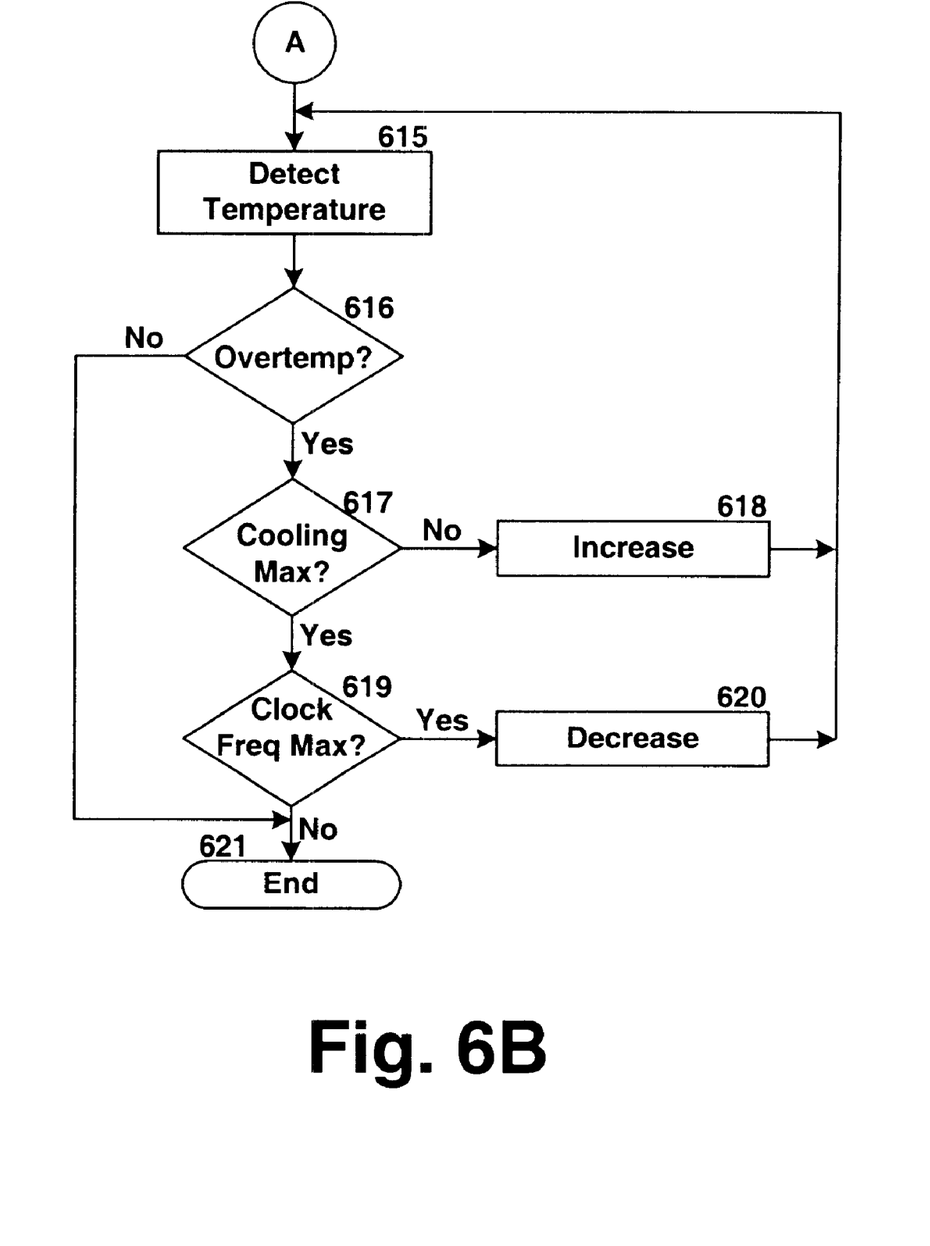
FIG. 6B shows a remaining portion of the flow chart of the process employed by the graphics subsystem clock adjustment device of the present invention.

With reference now to FIG. 6A and FIG. 6B, a flow chart of the steps of an exemplary method of the present invention is shown. FIG. 6A is the first portion of the flow chart and FIG. 6B is the remaining portion of the flow chart. The flow chart is for the graphics subsystem clock adjustment device embodiment shown in FIG. 3 (e.g., clock adjustment device 100). It should be appreciated that the flow chart of FIG. 6A and FIG. 6B may change with differing embodiments of the present invention. The method 600 show the steps involved in adjusting the clock frequency and the amount of cooling.

Process 600 begins in step 601, where the clock adjustment device is initialized. In this step the device can be configured for any graphics subsystem specific information or computer system specific information (e.g. the number of processors in the system, the initial clock frequency, graphics subsystem thermal limits, and the like). In step 602, the device generates the initial clock frequency. The computer system functions nominally, using the clock frequency generated in step 602 as the master clock frequency for all its operations. In step 603, the device detects a load on the graphics subsystem. In step 604, the device determines whether the detected load is a high load or a low load. If the detected load is a high load, the device checks the clock frequency, step 605, and increases it to maximum if not already at maximum, step 606. If the graphics subsystem is not under high load, the device decreases the clock frequency if the clock frequency is at maximum, in steps 607 and 608. In step 609, the device detects an amount of cooling delivered from a cooling apparatus.

Referring still to FIG. 6A and 6B, the clock adjustment device can be configured to set any standard amount of cooling upon computer system start up. In this embodiment, the device sets a normal amount of cooling, as opposed to a maximum amount of cooling, initially. In step 610, the device detects the load on the graphics subsystem. If the load is high, the amount of cooling is set to maximum, if not already at maximum, in steps 611, 612. If the load is not high and the amount of cooling is at maximum, the amount of cooling is decreased, in steps 613, 614. In step 615, a temperature of the graphics subsystem is detected. The device then determines whether the temperature represents an over temperature condition, step 616. If an over temperature condition is detected, in step 616, the amount of cooling is increased, if not already maximum, in steps 617, 618. If the amount of cooling is maximum, and the clock frequency is maximum, the clock frequency is reduced, in steps 619, 620. At the conclusion of step 619, or, if no over temperature condition is detected in step 616, the process ends, step 621, and starts over again with step 603, detect a load on the graphics subsystem. From step 603, the process repeats as described above, as long as the computer system is in operation.

Figure 7:
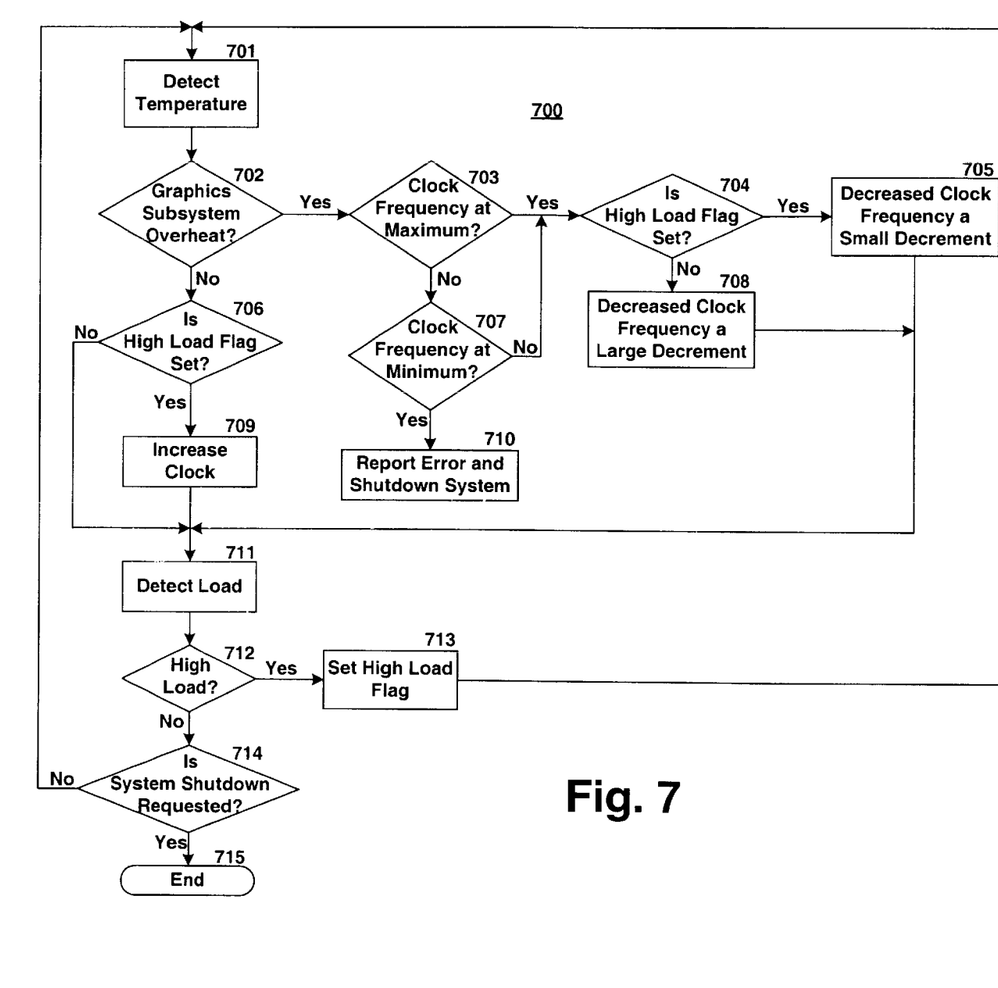
FIG. 7 shows a flowchart of the steps of an alternative process employed by the graphics subsystem clock adjustment device of the present invention.

Referring now to FIG. 7, a flowchart of the steps of a process 700 in accordance with an alternate embodiment of present invention is shown. As with the flow chart shown in FIG. 6A, process 700 shows the operating steps of the graphics subsystem clock adjustment device embodiment shown in FIG. 3 (e.g., clock adjustment device 100).

Process 700 is substantially similar to process 600, however, process 700 is focused primarily on detecting graphics subsystem over heat. Process 700 begins in step 701 where the temperature of the graphics subsystem is detected. As shown in steps 702–705, where a graphics subsystem over heat is detected, the clock frequency is at maximum, and a corresponding high load flag is set, the clock frequency is decreased by small decrement. As shown by steps 707–710, if an over heat is detected and the clock frequency has already been reduced to minimum, an error is reported and the system shutdown. Thus, as shown in steps 702–710, when an over heat is detected, the clock frequency is decreased in either small or large decrements until either the over heat goes away or the system is shutdown.

Steps 711–713 show how process 700 reduces clock frequency in either large decrements or small decrements according to whether the graphics subsystem is under high load. High load conditions are indicated by the high load flag as shown in step 713. As shown by steps 714 and 715, process 700 continues until system shutdown is requested.

Thus, the present invention provides a dynamic graphics subsystem clock frequency adjustment method and system that adjusts the heat output of the graphics subsystem of a computer without requiring periods of non-use. The present invention provides a solution that does not involve the use of complex external components for augmenting heat dissipation, and does not unnecessarily add cost and complexity to a computer system. The system of the present invention operates efficiently, allowing the graphics subsystem to function at maximum performance when possible, but does not remove graphics processing capability to reduce heat output. Many graphics software applications typically demand very fast graphics subsystems in order to deliver their best overall performance for the user. To accommodate them, the method and system of the present invention runs graphics software programs, or some portions thereof, at peak performance for the user, yet does not lead to over heating of the graphics subsystem as well as preventing other undesirable effects of the system on the users environment such as excessive noise output.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer system having a central processing unit (CPU) and a graphics subsystem, a graphics subsystem clock adjustment device, comprising:
   a clock pulse generator coupled to the graphics subsystem for generating a clock frequency, wherein the clock frequency is variable over a range;
   a controller coupled to the clock pulse generator for adjusting the clock frequency from the clock pulse generator over the range; and
   an interface coupled to the controller, for communicating a load on the graphics subsystem to the controller, such that the controller adjusts the clock frequency of the clock pulse generator in response to the load on the graphics subsystem.

2. The clock adjustment device of claim 1 wherein the clock frequency from the clock pulse generator is dynamically adjusted by the controller depending upon a load placed on the graphics subsystem by a software program or a portion of a software program.

3. The clock adjustment device of claim 2 wherein the clock frequency coupled to the graphics subsystem is reduced when the load placed on the graphics subsystem by the software program is reduced and the clock frequency coupled to the graphics subsystem is increased when the load placed on the graphics subsystem is increased.

4. The clock adjustment device of claim 1 further comprising a cooling device coupled to the controller for delivering an amount of cooling to the graphics subsystem, the amount of cooling dynamically adjusted depending upon the load placed on the graphics subsystem.

5. The clock adjustment device of claim 4 wherein the amount of cooling delivered to the graphics subsystem is adjusted depending upon a load placed on the graphics subsystem, the amount of cooling increased when the load placed on the graphics subsystem increases.

6. The clock adjustment device of claim 1 wherein the controller individually adjusts the clock frequency coupled to a plurality of subcomponents of the graphics subsystem in response to respective loads placed on the plurality of subcomponents by the software program.

7. The clock adjustment device of claim 1 further comprising a temperature sensor coupled to the controller, the temperature sensor coupled to the graphics subsystem, for sending a temperature of the graphics subsystem to the controller, wherein the controller adjusts the clock frequency depending upon the temperature of the graphics subsystem.

8. In a computer system having a central processing unit (CPU) and a graphics subsystem, a graphics subsystem clock adjustment device, comprising:
   a clock pulse generator coupled to the graphics subsystem for generating a clock frequency, wherein the clock frequency is variable over a range;
   a controller coupled to the clock pulse generator for adjusting the clock frequency from the clock pulse generator over the range;
   an interface coupled to the controller, for communicating a load on the graphics subsystem to the controller, such that the controller adjusts the clock frequency of the clock pulse generator in response to the load on the graphics subsystem, wherein the clock frequency from the clock pulse generator is dynamically adjusted by the controller depending upon a load placed on the graphics subsystem by a software program or a portion of a software program.

9. The clock adjustment device of claim 8 further comprising a pipeline control included in the graphics subsystem operable for controlling a graphics pipeline included in the graphics subsystem, the controller determining the load on the graphics subsystem via the pipeline control.

10. The clock adjustment device of claim 8 wherein the clock adjustment device is coupled to the graphics subsystem to receive clock management commands from the software program operable for adjusting the clock frequency for the graphics subsystem.

11. The clock adjustment device of claim 8 wherein the controller is configured to increase the clock frequency for the graphics subsystem when an increased load on the graphics subsystem is detected.

12. The clock adjustment device of claim 8 wherein the clock adjustment device and the graphics subsystem are integrated into a single semiconductor die.

13. The clock adjustment device of claim 8 further comprising a cooling device coupled to the controller for delivering an amount of cooling to the graphics subsystem, the amount of cooling dynamically adjusted depending upon the load placed on the graphics subsystem.

14. The clock adjustment device of claim 1 further comprising a temperature sensor coupled to the controller, the temperature sensor coupled to the graphics subsystem, for sending a temperature of the graphics subsystem to the controller, wherein the controller adjusts the clock frequency depending upon the temperature of the graphics subsystem.

15. The clock adjustment device of claim 8 wherein the graphics subsystem is an Open GL compliant graphics subsystem.

16. In a computer system having a central processing unit (CPU) and a graphics subsystem, a method for adjusting a clock frequency coupled to the graphics subsystem, comprising the steps of:

adjusting the clock frequency in a range of frequencies of a variable clock pulse generator, wherein the clock frequency is used by the graphics subsystem to synchronize internal operations of the graphics subsystem;

detecting a load on the graphics subsystem, wherein the load originates from software executing on the graphics subsystem;

increasing the clock frequency when the load placed on the graphics subsystem exceeds a threshold; and decreasing the clock frequency when the load placed on the graphics subsystem does not exceed the threshold, such that the clock frequency is dynamically adjusted in response to the load placed on the graphics subsystem by software.

17. The method of claim 16, further comprising the steps of:

determining whether an over temperature condition exists in the graphics subsystem; and decreasing the clock frequency if there is an over temperature condition in the graphics subsystem.

18. The method of claim 16, further comprising the steps of:

setting an amount of cooling delivered to the graphics subsystem;

increasing the amount of cooling delivered to the graphics subsystem when the load placed on the graphics subsystem by software exceeds the threshold; and decreasing the amount of cooling delivered to the graphics subsystem when the load placed on the graphics subsystem by software does not exceed the threshold, such that the amount of cooling is dynamically adjusted in response to the load placed on the graphics subsystem.

19. The method of claim 18, further comprising the steps of:

determining whether an over temperature condition exists in the graphics subsystem; and increasing the amount of cooling if there is an over temperature condition in the graphics subsystem.

20. The method of claim 18, further comprising the steps of:

determining an RF emission level of the graphics subsystem;

decreasing the clock frequency if the RF emission level exceeds a predetermined limit.

* * * * *

UNITED STATES PATENT AND TRADEMARK OFFICE
CERTIFICATE OF CORRECTION

PATENT NO. : 6,397,343 B1
DATED : May 28, 2002
INVENTOR(S) : Ian M. Williams et al.

It is certified that error appears in the above-identified patent and that said Letters Patent is hereby corrected as shown below:

Column 2,
Line 11, insert -- a -- after "perform";

Column 3,
Line 21, delete "a" after "the";

Column 5,
Line 44, delete "the" after "to" at the beginning of the line;

Column 7,
Line 35, delete one occurrence of the word "the";

Column 8,
Line 39, delete "In" and insert -- It -- therefor;
Line 48, insert -- to -- after "203";

Column 9,
Line 2, insert -- a -- after "including";
Line 19, delete "to" and insert -- the -- therefor;

Column 10,
Line 56, delete "buss" and insert -- bus -- therefor;

Column 11,
Line 25, insert -- to -- after "response";
Line 35, insert -- the -- before "present" at the beginning of the line;
Line 48, insert -- of -- after "consist";

UNITED STATES PATENT AND TRADEMARK OFFICE
CERTIFICATE OF CORRECTION

PATENT NO. : 6,397,343 B1
DATED : May 28, 2002
INVENTOR(S) : Ian M. Williams et al.

It is certified that error appears in the above-identified patent and that said Letters Patent is hereby corrected as shown below:

Column 12,
Line 9, delete "show" and insert -- shows -- therefor;

Column 14,
Line 66, delete "claim 1" and insert -- claim 8 -- therefor.

Signed and Sealed this

Twenty-first Day of January, 2003

JAMES E. ROGAN
*Director of the United States Patent and Trademark Office*